United States Patent
Hanes et al.

(10) Patent No.: US 6,779,324 B2
(45) Date of Patent: Aug. 24, 2004

(54) ADJUSTABLE DEBRIS SHIELD FOR A HAND-HELD POWER TRIMMER

(75) Inventors: Adam Hanes, Graham, NC (US); Charles R. Spitler, Haw River, NC (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/137,323

(22) Filed: May 3, 2002

(65) Prior Publication Data

US 2003/0205391 A1 Nov. 6, 2003

(51) Int. Cl.[7] .............................................. A01D 34/00
(52) U.S. Cl. ........................................ 56/12.7; 30/276
(58) Field of Search ............................. 56/320.1, 16.9, 56/17.4, 12.7; 30/276, 286; 172/13, 15

(56) References Cited

U.S. PATENT DOCUMENTS

| | | | |
|---|---|---|---|
| 3,797,213 A | | 3/1974 | Sadow, Jr. et al. |
| 4,049,059 A | * | 9/1977 | Weibling ................... 172/15 |
| 4,364,435 A | * | 12/1982 | Tuggle et al. ............... 172/15 |
| 4,679,385 A | * | 7/1987 | Carmine .................... 56/16.9 |
| 4,736,573 A | * | 4/1988 | Seck ........................ 56/17.4 |
| 4,756,148 A | | 7/1988 | Gander et al. |
| 4,803,831 A | * | 2/1989 | Carmine .................... 56/16.9 |
| 4,864,728 A | * | 9/1989 | Kloft et al. .................. 30/276 |
| 5,010,720 A | | 4/1991 | Corsi |
| 5,279,100 A | | 1/1994 | Pruitt et al. |
| 5,385,005 A | | 1/1995 | Ash |
| 5,423,126 A | * | 6/1995 | Byrne ........................ 30/276 |
| 5,490,371 A | | 2/1996 | Potucek, III |
| 5,768,786 A | * | 6/1998 | Kane et al. .................. 30/276 |
| 5,940,973 A | | 8/1999 | Kitz |
| 5,996,234 A | | 12/1999 | Fowler et al. |
| 6,052,976 A | | 4/2000 | Cellini et al. |
| 6,116,349 A | | 9/2000 | Wilson |
| 6,327,782 B1 | * | 12/2001 | Blevins ....................... 30/276 |

* cited by examiner

*Primary Examiner*—Árpád Fábián Kovács
(74) *Attorney, Agent, or Firm*—Morgan, Lewis & Bockius LLP

(57) ABSTRACT

A hand-held power tool includes an elongate shaft, a mounting structure disposed on one end of the elongate shaft, a cutting element, a prime mover, and an adjustable debris shield. The mounting structure has a rotation axis at an angle relative to the longitudinal axis of the elongate shaft. The cutting element is mounted to the mounting structure and includes at least one of a cutting line assembly and a rotary blade. The prime mover drives the mounting assembly to rotate the cutting element about the rotation axis. The adjustable debris shield has a first operative mode and a second operative mode. The adjustable debris shield has a first lateral span relative to the longitudinal axis when in the first operative mode and a second lateral span relative to the longitudinal axis when in the second operative mode. The second lateral is greater than the first lateral span.

10 Claims, 5 Drawing Sheets

ADJUSTABLE DEBRIS SHIELD FOR A HAND-HELD POWER TRIMMER

BACKGROUND OF THE INVENTION

Existing hand-held power trimmers can be configured as a string trimmer or as a brushcutter. It is believed that string trimmers can be used to cut leafy vegetation such as grass and weeds and that brushcutters can be used to cut heavier vegetation with thicker stems such as tall grasses, shrubs and sapling trees. The cutting element of these power tools can be driven by either an electric motor or an internal combustion engine.

Certain ones of these hand-held power tools can be converted between a brushcutter and a string trimmer by exchanging the cutting element between a rotary blade and a cutting line assembly. It is believed that the debris shield of a string trimmer is of a different size as compared to that for a brushcutter. In order to accommodate these two different types of cutting elements, it is believed that two distinctly sized shields are used and that the brushcutter shield extends a larger angular span about the rotation axis than does the shield for a string trimmer.

It is believed that a convertible hand-held power trimmer provided with a single shield will unduly restrict visibility when the power trimmer is configured as a string trimmer so that this dual purpose shield is sufficient for use with the rotary blade. It is believed that this oversized dual-purpose shield will span an unnecessarily large portion of the path of the cutting line, thus, possibly restricting the operator's visibility of the cutting circle and, in turn, possibly limiting the precision with which the vegetation can be trimmed such that unwanted cutting of the surrounding vegetation or other objects can occur.

SUMMARY OF THE INVENTION

The present invention provides a hand-held power tool including a debris shield adjustable between a first mode and second mode where the debris shield is initially configured in the first mode.

The present invention also provides a hand-held power tool including an elongate shaft, a mounting structure disposed on one end of the elongate shaft, a cutting element, a prime mover, and an adjustable debris shield. The mounting structure has a rotation axis at an angle relative to the longitudinal axis of the elongate shaft. The cutting element is mounted to the mounting structure and includes at least one of a cutting line assembly and a rotary blade. The prime mover drives the mounting assembly to rotate the cutting element about the rotation axis. The adjustable debris shield has a first operative mode and a second operative mode. The adjustable debris shield has a first lateral span relative to the longitudinal axis when in the first operative mode and a second lateral span relative to the longitudinal axis when in the second operative mode. The second lateral span is greater than the first lateral span.

The present invention yet also provides a hand-held power tool including an elongate shaft, a mounting structure disposed on one end of the elongate shaft, a cutting element, a prime mover, and an adjustable debris shield. The mounting structure has a rotation axis at an angle relative to the longitudinal axis of the elongate shaft. The cutting element is mounted to the mounting structure and includes at least one of a cutting line assembly and a rotary blade. The prime mover drives the mounting assembly to rotate the cutting element about the rotation axis. The adjustable debris shield has a first operative mode and a second operative mode. The adjustable debris shield includes a stationary wall and an extension wall. The stationary wall is secured to one of the mounting structure and the elongate shaft and extends toward the second end of the elongate shaft. The extension wall is coupled laterally adjacent to the stationary wall.

The present invention further provides a hand-held power tool including an elongate shaft, a mounting structure coupled to one end of the elongate shaft, a cutting element, a prime mover, and an adjustable debris shield. The mounting structure has a rotation axis at an angle relative to the longitudinal axis of the elongate shaft. The cutting element is mounted to the mounting structure and includes at least one of a cutting line assembly and a rotary blade. The prime mover drives the mounting assembly to rotate the cutting element about the rotation axis. The adjustable debris shield has a first operative mode and a second operative mode. The adjustable debris shield includes a stationary wall and an extension wall. The stationary wall is secured to one of the mounting structure and the elongate shaft and extends toward the second end of the elongate shaft. The extension wall is secured to the stationary wall and movable relative to the stationary wall between a first retracted position where the stationary wall substantially overlaps the extension wall and an extended position where the extension wall extends laterally from the stationary wall relative to the longitudinal axis.

The present invention provides a hand-held power tool including a debris shield adjustable between a string trimmer shield and a brushcutter shield where the debris shield is initially configured as a string trimmer shield.

The present invention further provides a hand-held power tool convertible between a string trimmer and a brushcutter including an elongate shaft, a mounting structure coupled to the first end of the elongate shaft having a rotation axis angled relative to the elongate shaft, a prime mover coupled to the mounting structure, a cutting element removably mounted to the mounting structure and a shield secured to one of the mounting structure and the elongate shaft. The cutting element rotates in a cutting plane perpendicular to the rotation axis. The shield includes a primary wall extending toward the second end of the elongate shaft and terminating in a rear edge. The rear edge is located at a position at least co-planar with the cutting plane. The shield has an angular span of less than 90 degrees about the rotation axis.

The present further provides a method for converting a hand-held power tool between a string trimmer and a brushcutter. The power tool includes an adjustable shield having a rotation axis, a longitudinal axis, a first operative mode, a second operative mode, a first lateral span in the first operative mode, and a second lateral span in the second operative mode. The second lateral span is greater than the first lateral span. The method includes attaching a cutting line assembly to the hand-held power tool. Next, the adjustable shield is placed in the first operative mode when the cutting line assembly is attached to the hand-held power tool. Then, the cutting line assembly is replaced with a rotary blade. The adjustable shield is then placed in the second operative mode when the cutting line assembly is replaced with the rotary blade.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENT

Figure 1:
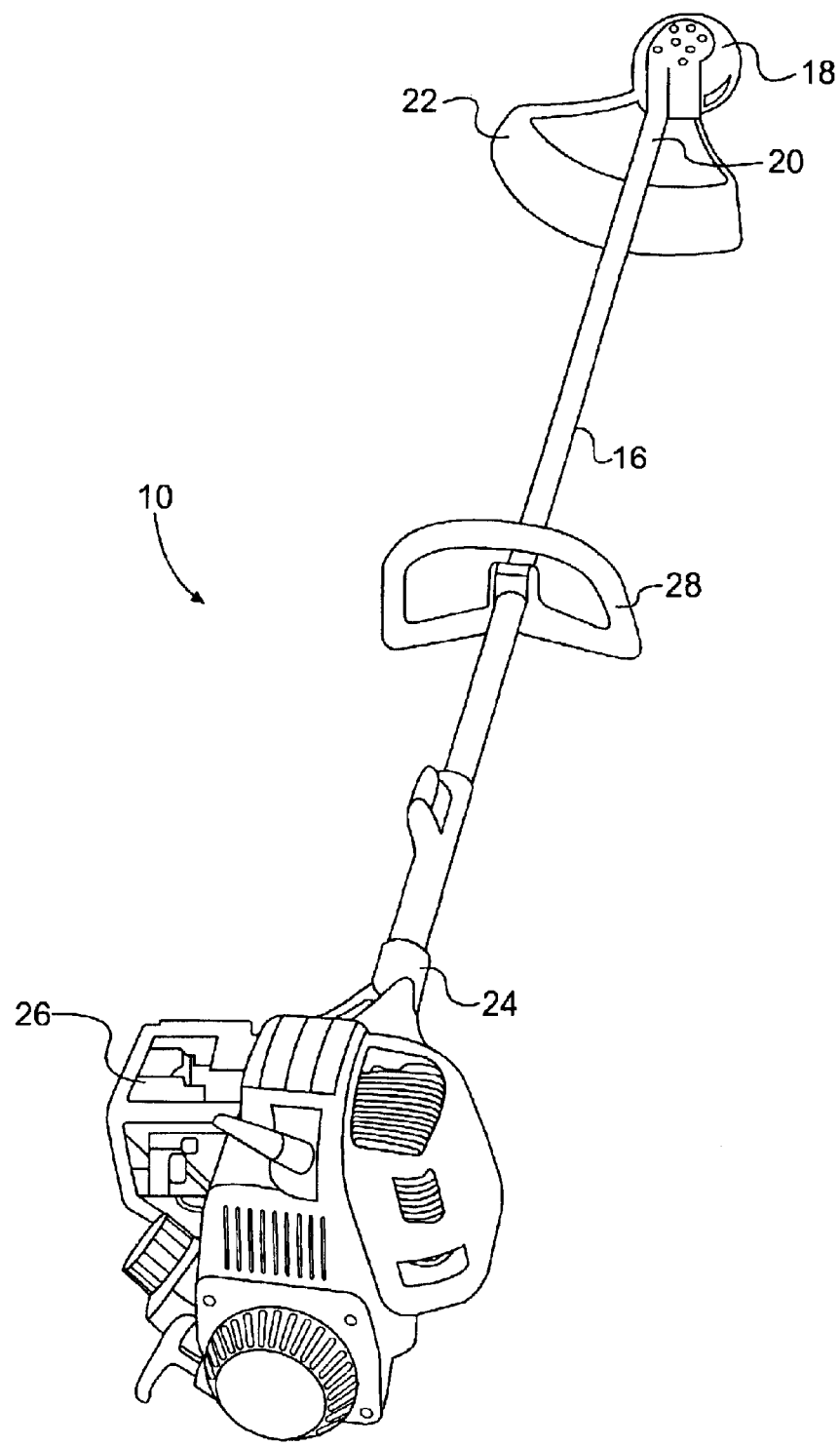
FIG. 1 is a perspective view of a hand-held power trimmer that is convertible between a string trimmer and a brushcutter according to the invention.
Figure 2:
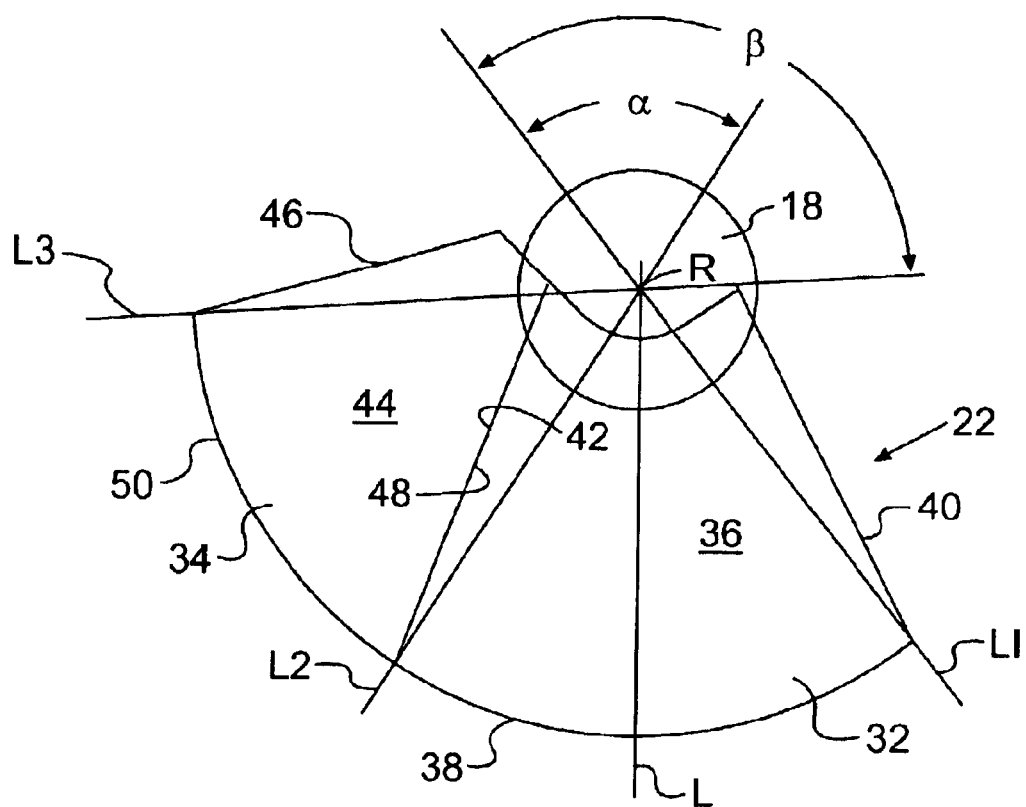
FIG. 2 is a top view of a schematic representation of the adjustable debris shield according to the invention.
Figure 3:
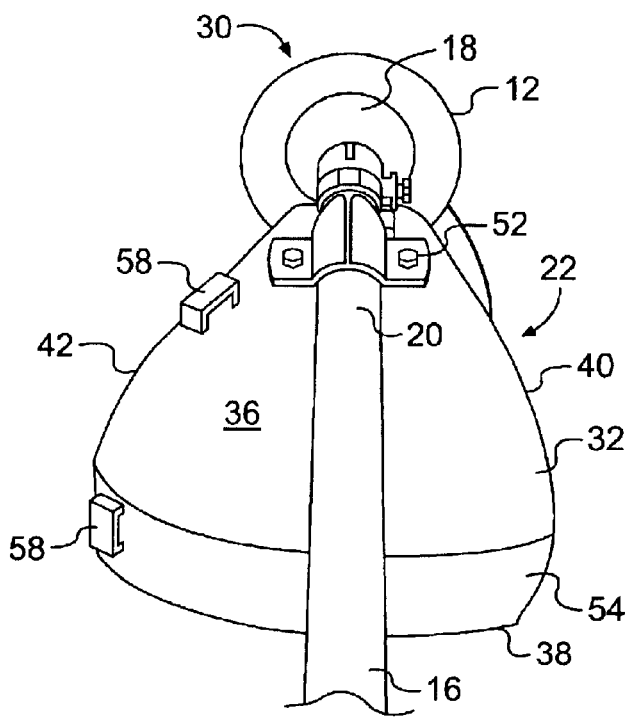
FIG. 3 is a rear perspective view of the cutting portion of a first embodiment of the trimmer shown in FIG. 1 configured as a string trimmer.
Figure 4:
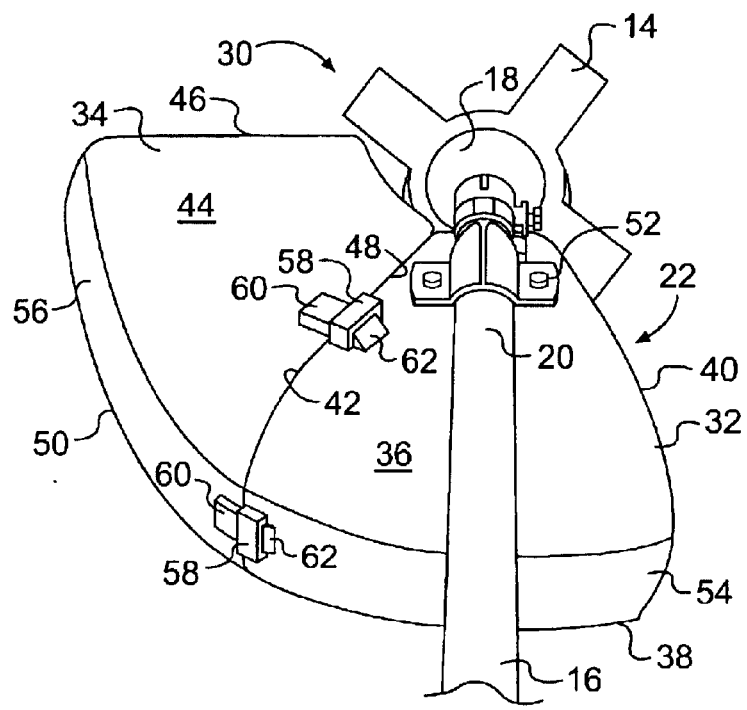
FIG. 4 is a rear perspective view of the cutting portion of the first embodiment of the trimmer shown in FIG. 1 configured as a brushcutter.
Figure 7:
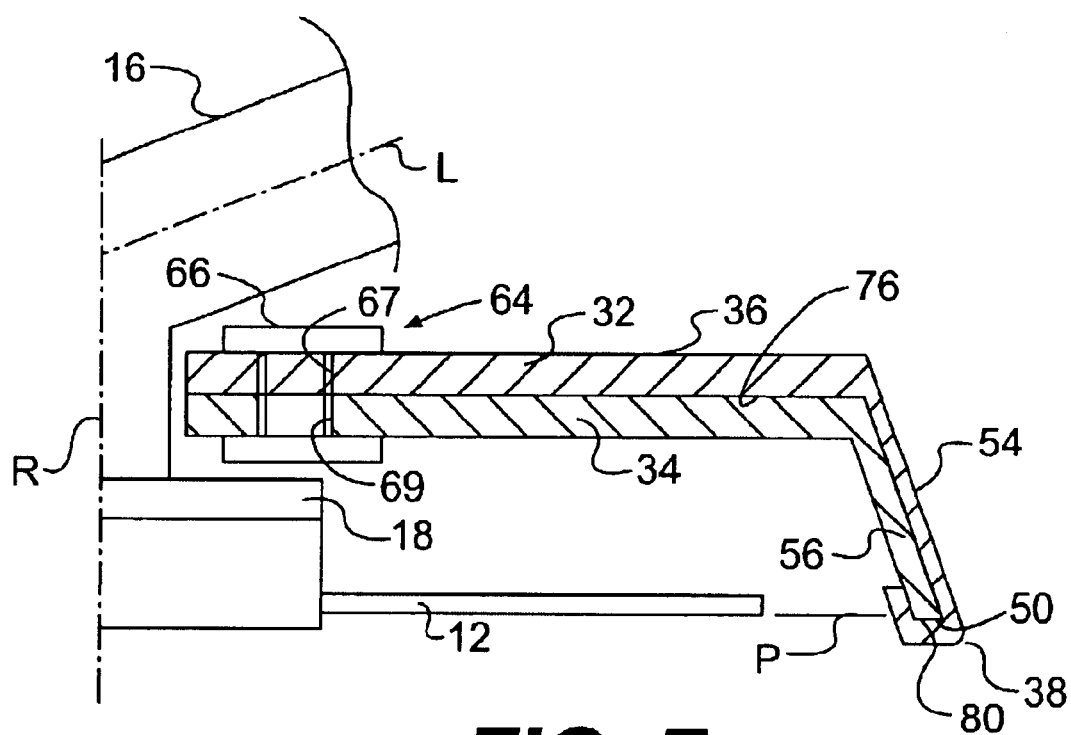
FIG. 7 is a cross-sectional view taken along VII—VII in FIG. 5.

FIG. 1 illustrates a hand-held power trimmer 10 that can be converted between a string trimmer and a brushcutter by exchanging the cutting element between a cutting line assembly (see FIG. 3) and a rotary blade (see FIG. 4). The hand-held power trimmer 10 includes an elongated shaft 16, an cutting element mount 18 positioned at one end 20 of the elongate shaft 16, an adjustable debris shield 22 extending from the cutting element mount 18 toward the other end 24 of the elongate shaft 16, a prime mover 26 coupled to the cutting element mount 18 and a handle 28 connected to the elongate shaft 16 intermediate its two ends 20, 24. As will be explained below, a cutting element 30, e.g., a cutting line assembly 12 or a rotary blade 14 can be connected to the cutting element mount 18. Referring to FIGS. 2 and 7, the cutting element mount 18 includes a rotation axis R (see FIGS. 2 and 7) and the elongate shaft 16 includes a longitudinal axis L extending at an angle relative to the rotation axis R.

Referring to FIG. 2, the adjustable debris shield 22 can accommodate the large swept area required for a brushcutter and provide maximum visibility for a string trimmer. The adjustable debris shield 22 can be adjusted laterally relative to the elongate shaft 16 between a string trimmer shield (see for example, FIGS. 3 and 5) and a brushcutter shield (see for example, FIGS. 4 and 6), with the brushcutter shield sweeping a larger angular span β about the rotational axis R of the cutting element 30 than does the string trimmer shield.

The adjustable debris shield 22 can include at least two cooperating shield members 32, 34 that can be selectively positioned laterally relative to one another. FIG. 2 schematically depicts the adjustability of the adjustable debris shield 22.

A primary one of the cooperating shield members 32, 34 is a stationary shield member 32 suspended above the cutting element mount 18. The stationary shield member 32 includes a primary stationary wall 36 extending substantially perpendicular to the rotation axis R and from the cutting element mount 18 rearwardly toward the other end 24 of the elongate shaft 16 at an angle relative to the longitudinal axis L of the elongate shaft 16 (omitted for clarity) and terminates at a rear edge 38.

The stationary wall 36 includes first and second side edges 40, 42, each spaced on either side of the longitudinal axis L. A rear edge 38 extends from the first side edge 40 to the second side edge 42. Lines L1, L2 extending from the junctions of the first and second side edges 40, 42 with the rear edge 38 to the rotation axis R define a minimum angular span α. In the preferred embodiments, the minimum angular span α is less than 90 degrees. The first and second side edges 40, 42 are preferably symmetrically spaced about longitudinal axis L, however an asymmetric lateral spacing can be employed.

The cutting element 30 rotates in a cutting circle formed by the outer edge of the cutting element 30. The stationary wall 36 overlaps less than one-quarter of the cutting circle. Also, the stationary wall 36 is located to cover the portion of the cutting circle closest to the other end 24 of the elongate shaft 16. This orientation exposes over 270 degrees of the cutting circle that includes both sides and the forward portion of the cutting circle. This permits the stationary wall 36 to provide maximum visibility of the cutting circle of the cutting element 30.

The other of the cooperating shield members 32, 34 is a supplemental shield member configured as an extension shield member 34 that is mounted relative to the stationary shield 32 such that the extension shield member 34 can be selectively positioned adjacent the stationary shield member 32. With the extension shield member 34 positioned laterally adjacent to the stationary shield member 32, the adjustable debris shield 22 is laterally extended relative to the elongate shaft 16 to a maximum angular span β described below.

The extension shield member 34 includes a supplemental extension wall 44, first side edge 46, second side edge 48 and a third edge 50. The third edge 50 extends from the first side edge 46 to the second side edge 48. The extension wall 44 extends substantially parallel to the stationary wall 36 when the extension shield member 34 is laterally adjacent to the stationary shield member 32.

A line L3 extending from the junction of the first side edge 46 of the extension wall 44 to the rotation axis R and the line L1 define a maximum angular span β that is greater than or equal to 90 degrees when the extension shield member 34 extends laterally from the stationary shield member 32.

This lateral adjustability is illustrated by a first embodiment where one of the cooperating shield members 32, 34 is detachable from the other shield member. The second embodiment illustrates one of the cooperating shield members 32, 34 to be movable relative to the other shield member.

FIGS. 3 and 4 illustrate the first embodiment of the adjustable debris shield 22. The stationary shield member 32 can be connected to the elongated shaft 16 by a bracket 52 to suspend the stationary shield member 32 above the cutting element mount 18. Alternatively, the stationary shield member 32 can be connected to the upper surface of the cutting element mount 18 by a bracket or directly by screws. The stationary shield member 32 includes a stationary wall 36 extending substantially perpendicular to the rotation axis R and from the cutting element mount 18 toward the other end 24 (omitted for clarity) of the elongate shaft 16. The stationary wall 36 includes a downwardly extending portion 54 and terminates at the rear edge 38. The transition to the downwardly extending portion 54 is shown as a sharp edge. However, other configurations of this transition are possible, such as a smooth radius.

The extension shield member 34 is coupled adjacent the stationary shield member 32 to permit the extension shield member 34 to be detached from the stationary shield member 32, as explained below. As illustrated in FIGS. 2 and 3, with the extension shield member 34 detached from the stationary shield member 32, the adjustable debris shield 22 has a minimum angular span a as defined above. As illustrated in FIGS. 2 and 4, with the extension shield member 34 coupled laterally adjacent to the stationary shield member 32, the adjustable debris shield 22 is laterally extended relative to the elongate shaft 16 to the maximum angular span β described above.

As viewed in FIG. 4, the extension wall 44 extends substantially parallel to the stationary wall 36 when the extension shield member 34 is attached laterally adjacent to the stationary shield member 32. The extension wall 44 includes a downwardly extending portion 56 that terminates at the third edge 50. The transition to the downwardly extending portion 56 is shown as a sharp edge. However, other configurations of this transition are possible, such as a smooth radius.

The detachable coupling can be in the form of latches 58 spaced along the second side edge 42 of the stationary wall 36. The latches 58 detachably receive corresponding tabs 60 provided adjacent the second side edge 48 of the extension shield member 34. The tabs 60 each include a ramp 62 that causes the tab 60 to resiliently deflect as it engages and disengages the respective latch 58 to allow selective attaching and detaching of the extension shield member 34. The number of latches 58 and tabs 60 can vary as long as the extension shield member 34 is firmly held in place. No tools or additional parts are necessary to change the lateral extent of the adjustable debris shield 22. Thus, the latches 58 and tabs 60 form a quick-connect coupling. However, the extension shield member 34 can be coupled to the stationary shield member by other techniques, such as threaded fasteners, cotter pins, and hook and loop fasteners.

Figure 5:
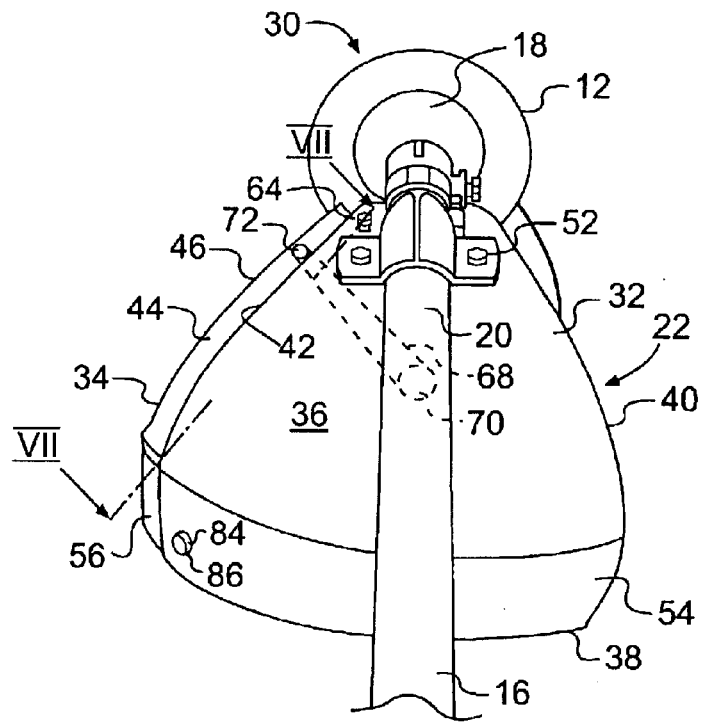
FIG. 5 is a rear perspective view of the cutting portion of a second embodiment of the trimmer shown in FIG. 1 configured as a string trimmer.
Figure 6:
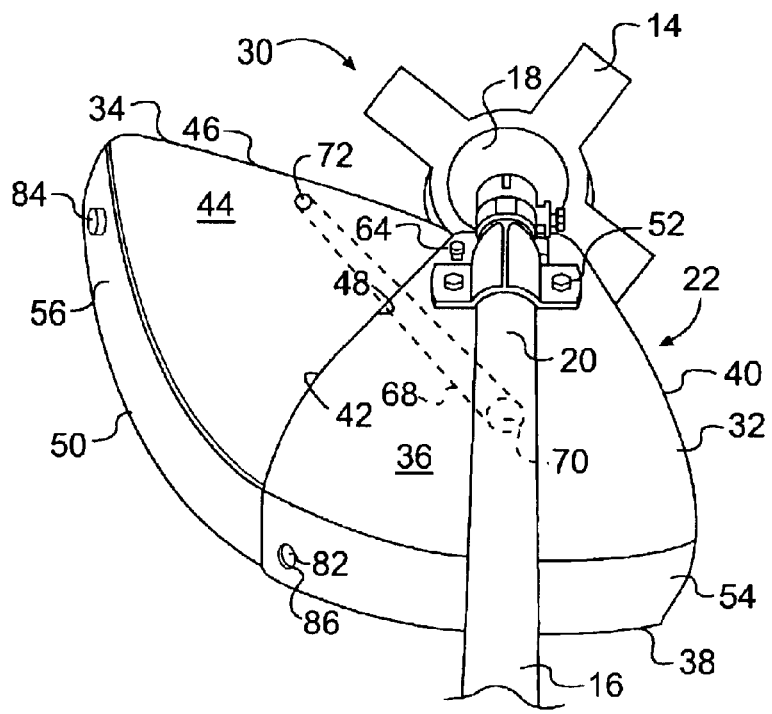
FIG. 6 is a rear perspective view of the cutting portion of the second embodiment of the trimmer shown in FIG. 1 configured as a brushcutter.

FIGS. 5–7 depict a second preferred embodiment that includes a stationary shield member 32 substantially the same as that of FIGS. 3 and 4 with like reference numerals indicating like structure. Therefore, only the differences will be described below.

The stationary shield member 32 and the extension shield member 34 can be coupled by a pivot 64. The pivot 64 permits the extension shield member 34 to be at least substantially retracted within the span of the stationary shield member 32 as illustrated in FIG. 5 to provide maximum visibility during operation of the hand-held power trimmer. When lateral extension of the adjustable debris shield 22 is desired, the extension shield member 34 is rotated about the pivot 64 and held in the extended position shown in FIG. 6 as will be discussed below. When in this position, the lateral span of the adjustable debris shield 22 is equal to the maximum angular span β schematically represented in FIG. 2.

As shown in FIG. 7, the pivot 64 can include a pin 66 inserted in holes 67, 69 formed in the stationary shield member 32 and the extension shield member 34. In the preferred embodiment, the diameter of the holes 67, 69 is slightly larger than that of the pin 66 to enable the extension shield member 34 to move relative to the stationary shield member 32.

Referring to FIGS. 5 and 6, a spring 68 (shown in phantom) biases the extension shield member 34 into the extended position (FIG. 6). One end 70 of the spring 68 can be connected to the stationary shield member 32 at a point underneath the elongate shaft 16 as viewed in FIGS. 5 and 6. The other end 72 of the spring 68 can be connected to the first side edge 46 of the extension shield member 34. Preferably, the spring 68 is a rotary spring but other springs, such as a compression spring, a leaf spring or a regular spring, can be used. In an alternate embodiment, the spring 68 may be coiled about the pin 66.

As shown in FIG. 7, the stationary shield member 32 includes a lower guide groove 80 into which the third edge 50 of the extension shield 34 extends. The pivot 64, the lower guide groove 80 and the third edge 50 of the extension shield member 34 cooperate to support the extension shield member 34 on the stationary shield member 32 and to properly align the extension shield member 34 relative to the stationary shield member 32 at all time. Alternatively, the extension shield member 34 can be mounted above the stationary shield member 32 with the location of the lower guide groove 80 reversed.

A lock configured as two resilient buttons 82, 84 can be provided on extension skirt 56. The resilient buttons 82, 84 are biased to engage a stop configured as a hole 86 formed in the stationary skirt 54 near the second side edge 42 of the stationary shield member 32. When the extension shield member 34 is placed in the retracted position (FIG. 5), the first resilient button 84 aligns with the button hole 86 and is biased into engagement with the button hole 86. When the extension shield member 34 is placed in the extended position (FIG. 6), the second resilient button 82 aligns with the button hole 86 and is biased into engagement with the button hole 86. The resilient buttons 82, 84 and the button hole 86 also cooperate to prevent the extension shield member 34 from dangling from the stationary shield member 32 toward the cutting element.

The buttons and the button hole can be reversed so that the buttons are on the stationary shield member and the button hole is on the extension shield member. The buttons can be conventionally known buttons such as VALPO™ buttons. Alternatively, the buttons can be replaced by a pair of holes in each of the shield members into which a pin can be secured to lock the extension shield member in the desired position. Also, a plurality of intermediate positions for the extension can be provided by forming a plurality of button holes, for example, in one of the shield members that are intermediate the fully retracted and fully extended positions of the button holes 82, 84.

In the preferred embodiments, FIGS. 3, 5 and 7 show the power trimmer 10 configured as a string trimmer by having the cutting line assembly 12 secured to the cutting element mount 18. The adjustable debris shield 22 is configured as a string trimmer debris shield by either not attaching the extension shield member 34 to the stationary shield member 32 (FIG. 3) or by rotating the extension shield member 34 to retract within the stationary shield member 32 (FIG. 5). As viewed in FIG. 7., the stationary skirt 54 and the extension skirt 56 extend downward to a position at least coplanar with the cutting plane P of the cutting line assembly 12. Preferably, the skirts 54, 56 extend below the cutting plane P, as depicted in FIG. 7.

In the preferred embodiments, FIGS. 4 and 6 show the power trimmer 10 configured as a brushcutter by having a rotary blade 14 secured to the cutting element mount 18. The adjustable debris shield 22 is configured to a brushcutter debris shield by either attaching the extension shield member 34 to the stationary shield member 32 (FIG. 4) or by rotating the extension shield member 34 laterally away from the stationary shield member 32 (FIG. 6) under the bias of the spring 68.

The stationary shield member 32 provides maximum visibility when the hand-held power trimmer is being used in the string trimmer configuration so that inadvertent damage to surrounding vegetation or other objects can be promoted. When the hand-held power trimmer is configured as a brushcutter, the adjustable debris shield 22 provides a maximum lateral span relative to the longitudinal axis L.

Preferably, the elongated shaft 16 is hollow. The elongate shaft 16 can be configured as a shaft extending straight to the cutting element mount 18, as depicted in the preferred embodiments, or it can curve downward toward the cutting element mount 18 at a portion near the cutting element mount 18. The prime mover 26 can be either an electric motor or an internal combustion engine. The prime mover 26 can be mounted at either end 20, 24 of the elongate shaft 16. If the prime mover 26 is mounted at the other end 24 from the cutting element mount 18, then a flexible shaft (not shown) rotationally supported within the elongate shaft 16 is used to transmit torque generated by the prime mover 26 to the cutting element mount 18. This arrangement is conventionally known in the art and no further explanation is provided. If the prime mover 26 is located at the one end 20 of the elongate shaft adjacent the cutting element mount 18, then the elongate shaft 16 may be a solid shaft.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A hand-held power trimmer and cutter comprising:
    an elongate shaft having a first end and a second end lying along a longitudinal axis;
    a mounting structure disposed on the first end of the elongate shaft and having a rotation axis at an angle relative to the longitudinal axis;
    a cutting element mounted to the mounting structure and including one of at least a cutting line assembly and a blade; and
    a prime mover driving the mounting structure to rotate the cutting element about the rotation axis;
    an adjustable debris shield a having first operative mode and a second operative mode;
    the adjustable debris shield having a first lateral span relative to the longitudinal axis and a first radial length when in the first operative mode and a second lateral span relative to the longitudinal axis and a second radial length when in the second operative mode; the second lateral span being greater than the first lateral span and the first radial length being substantially equal to the second radial length; wherein the adjustable debris shield comprises:
        a stationary wall secured to one of the mounting structure and the elongate shaft and extending toward the second end of the elongate shaft; and
        an extension wall pivotally connected to the stationary wall at a position on the stationary wall spaced from the elongate shaft such that the extension wall is selectively positionable laterally adjacent to the stationary wall.

2. The hand-held power trimmer and cutter according to claim 1, wherein the stationary wall comprises:
    an outer surface having;
        a first side edge;
        a second side edge; and
        a rear edge extending from the first side edge to the second side edge and spaced from the mounting structure by the first side edge and the second side edge; and
    wherein the extension wall including:
        an outer surface having:
            a first side edge selectively positionable proximate the second side edge of the stationary wall;
            a second side edge; and
            a third edge extending from the first side edge to the second side edge.

3. The hand-held power trimmer and cutter according to claim 2, wherein the second side edge of the extension wall is adjacent to the first side edge of the stationary wall when the adjustable shield is in the second operative mode.

4. The hand-held power trimmer and cutter according to claim 1, wherein the first lateral span comprises an angular span of less than 90 degrees about the axis of rotation and the second lateral span includes an angular span of at least 90 degrees.

5. A hand-held power trimmer and cutter comprising:
    an elongate shaft having a first end and a second end lying along a longitudinal axis;
    a mounting structure disposed on the first end of the elongate shaft and having a rotation axis at an angle relative to the longitudinal axis;
    a cutting element mounted to the supported structure and including one of at least a cutting line assembly and a blade;
    a prime mover driving the mounting structure to rotate the cutting element about the rotation axis; and
    an adjustable debris shield including:
        a stationary wall secured to one of the mounting structure and the elongate shaft and extending toward the second end of the elongate shaft; and
        an extension wall pivotally connected to the stationary wall at a position on the stationary wall spaced from the elongate shaft such that the extension wall is movable with respect to the stationary wall between a first retracted position where the stationary wall substantially overlaps the extension wall and an extended position where the extension wall extends laterally from the stationary wall relative to the longitudinal axis.

6. The hand-held power trimmer and cutter according to claim 5, further comprising a pivot coupling the extension wall to the stationary wall.

7. The hand-held power tool according to claim 5, wherein the stationary wall comprises a first radial length and the extension wall includes a second radial length substantially equal to the first radial length.

8. The hand-held power trimmer and cutter according to claim 6, further comprising a spring connected between the stationary wall and the extension wall and biasing the extension wall from the retracted position to the extended position.

9. The hand-held power trimmer and cutter according to claim 8, wherein one of the stationary wall and the extension wall includes a lock engageable with the other of the stationary wall and the extension wall;
    the extension wall being selectively secured in each of the retracted position and the extended position when the lock engages the other of the stationary wall and the extension wall.

10. The hand-held power trimmer and cutter according to claim 9, wherein other of the stationary wall and the extension wall including a stop engageable with the lock.

* * * * *